(12) United States Patent
Ji et al.

(10) Patent No.: US 11,742,939 B2
(45) Date of Patent: Aug. 29, 2023

(54) DISTRIBUTED FIBER OPTIC SENSOR PLACEMENT

(71) Applicant: NEC Laboratories America, Inc., Princeton, NJ (US)

(72) Inventors: Philip Ji, Cranbury, NJ (US); Ting Wang, West Windsor, NJ (US); Zilong Ye, La Verne, CA (US)

(73) Assignee: NEC Corporation

( * ) Notice: Subject to any disclaimer, the term of this patent is extended or adjusted under 35 U.S.C. 154(b) by 0 days.

(21) Appl. No.: 17/496,722

(22) Filed: Oct. 7, 2021

(65) Prior Publication Data

US 2022/0149932 A1  May 12, 2022

Related U.S. Application Data

(60) Provisional application No. 63/093,323, filed on Oct. 19, 2020, provisional application No. 63/089,098, filed on Oct. 8, 2020.

(51) Int. Cl.
*H04B 10/032* (2013.01)
(52) U.S. Cl.
CPC .................................. *H04B 10/032* (2013.01)
(58) Field of Classification Search
None
See application file for complete search history.

(56) References Cited

U.S. PATENT DOCUMENTS

| | | | |
|---|---|---|---|
| 2002/0097680 A1* | 7/2002 | Liu | H04Q 3/66 370/386 |
| 2003/0147352 A1* | 8/2003 | Ishibashi | H04J 14/0228 370/248 |
| 2004/0004938 A1* | 1/2004 | Buddhikot | H04L 45/28 370/238 |
| 2011/0268439 A1* | 11/2011 | Gerstel | H04J 14/0269 398/59 |
| 2013/0216224 A1* | 8/2013 | Patel | H04J 14/0267 398/49 |
| 2013/0216225 A1* | 8/2013 | Patel | H04J 14/021 398/49 |
| 2018/0340801 A1* | 11/2018 | Kelley | G01D 5/353 |

OTHER PUBLICATIONS

Anliang Cai et al., 'Multicast Routing and Distance-Adaptive Spectrum Allocation in Elastic Optical Networks With Shared Protection', Journal of Lightwave Technology, vol. 34, Issue 17, pp. 4076-4088, Sep. 1, 2016 (sections III.A.-III.D, V).

\* cited by examiner

*Primary Examiner* — David W Lambert
(74) *Attorney, Agent, or Firm* — Joseph Kolodka

(57) ABSTRACT

Aspects of the present disclosure describe distributed fiber optic sensor systems, methods, and structures that advantageously enable/provide for the proper placement/assignment of sensors in the DFOS network to provide for high reliability, fault tolerant operation that survives fiber failures.

9 Claims, 13 Drawing Sheets

DISTRIBUTED FIBER OPTIC SENSOR PLACEMENT

CROSS REFERENCE

This disclosure claims the benefit of U.S. Provisional Patent Application Ser. No. 63/089,094 filed 8 Oct. 2020 and U.S. Provisional Patent Application Ser. No. 63/093,323 filed 19 Oct. 2020, the entire contents of each being incorporated by reference as if set forth at length herein.

TECHNICAL FIELD

This disclosure relates generally to fiber optic telecommunications networks and distributed fiber optic sensing (DFOS) systems, methods, and structures. More specifically, it pertains the efficient deployment of DFOS sensors for reliable service and tolerance/immunity to link failure(s).

BACKGROUND

Empowered by the rapid advancement of fiber optic sensing techniques recently, network carriers can upgrade their network infrastructure with sensing applications and services (e.g., monitoring traffic, road condition, etc.)—in addition to providing communication services—thus achieving a paradigm known in the art as "Infrastructure-as-a-Sensor" (IaaSr).

While such sensor upgrades and resulting services have found widespread applicability, the network infrastructure(s) remain vulnerable to a variety of failures including link failures that may result from fiber cuts. A critical challenge then for IaaSr service providers is how to efficiently deploy DFOS sensors that are tolerant of and/or immune to failure to achieve and provide a reliable level of IaaSr service.

SUMMARY

An advance in the art is made according to aspects of the present disclosure directed to DFOS systems, methods, and structures that advantageously provide for the proper placement/assignment of sensors in a DFOS network to provide for high reliability, fault tolerant operation that survives fiber failures.

Viewed from a first aspect, our inventive procedure provides a reliable yet cost efficient IaaSr service or DFOS assignment that is tolerant of a single link failure. Our procedure allows a backup DFOS resources to be shared among multiple primary DFOS assignments, thus achieving a cost-efficient way of providing highly reliable IaaSr service. Furthermore, our procedure treats the assignment of primary and backup DFOS equally and determines these assignments using a one-step global optimization process, thus achieving a close-to-optimal result in terms of the number of DFOS sensors used.

Viewed from another aspect, our inventive procedure includes three sub-procedures. First, all possible fiber sensing routes (constrained by the sensing range limit) on each node are identified and considered as candidates for primary DFOS assignment. Second, all possible fiber sensing route trees (constrained also by the sensing range limit) on each node are identified considered as candidates for backup DFOS assignment. Finally, all primary DFOS candidates and backup DFOS candidates are considered equally, and a greedy algorithm is employed to select a minimum set of DFOS assignments from the primary candidates and backup candidates, such that each link is sensed (or covered) at least once from each direction. Additionally, our inventive procedure ensures that, on a particular link that is shared by multiple primary fiber sensing routes, the number of backup fiber sensing services is greater than or equal to the number of primary fiber sensing services, such that each primary fiber sensing service will have at least one backup fiber sensing service if/when a single link failure occurs.

To summarize, our inventive procedure according to aspects of the present disclosure: achieves a close-to-optimal results in terms of the number of sensors used, through an efficient shared protection method that provides reliable IaaSr services against single link failure; is a novel approach that determine the assignment of primary DFOS and backup DFOS in a one-step global optimization manner; determines where to place the primary DFOS sensors to achieve fully IaaSr service coverage in an existing telecommunication network infrastructure; determines primary fiber sensing route(s) (including the assignment of the routing and the sensing range) for each deployed primary DFOS sensor(s); determines placement of backup DFOS sensors to achieve protection for the IaaSr services against single link failure; determines a backup fiber sensing routing tree (including the assignment of the routing and the sensing range) for each deployed backup DFOS sensors; and determine the backup fiber sensing route (including the assignment of the routing and the sensing range) for the utilized backup DFOS sensors when a link failure occurs.

BRIEF DESCRIPTION OF THE DRAWING

A more complete understanding of the present disclosure may be realized by reference to the accompanying drawing in which.

DESCRIPTION

Figures 1A, 1B, 1C:
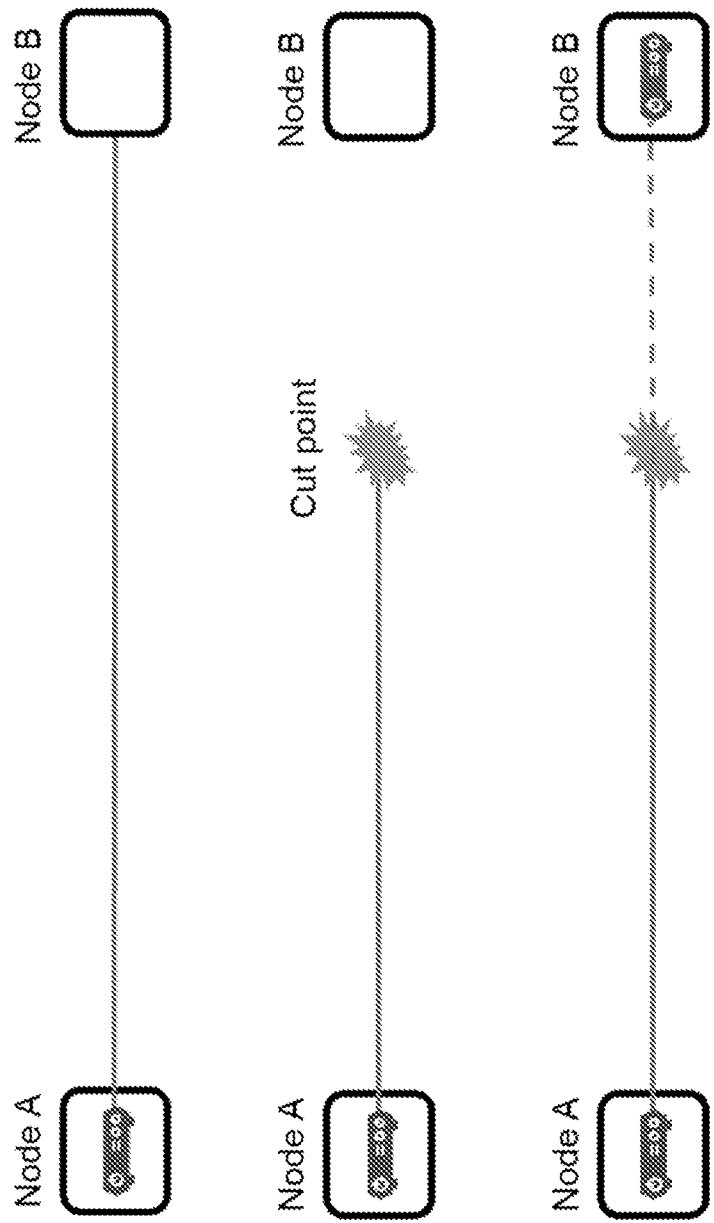
FIG. 1(A), FIG. 1(B), and FIG. 1(C) are schematic diagrams illustrating protection of a fiber and cut point of an illustrative single-ended prior art DOFS system.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background—we begin by noting that because DFOS sensors (such as distributed acoustic sensors (DAS), distributed vibration sensors (DVS), distributed temperature sensors (DTS), distributed strain sensors (DSS)), detect backscattered signals (such as Rayleigh backscattering, Raman backscattering, and Brillouin backscattering) of optical pulses generated/output by an optical source included as part of overall DFOS sensor hardware (i.e, an interrogator), it is usually what is known in the art as a single-ended system. In other words, a transmitter and receiver are located at a same end of a sensing fiber.

FIG. 1(A), FIG. 1(B), and FIG. 1(C) are schematic diagrams illustrating protection of a fiber and cut point of an illustrative single-ended prior art DOFS system. With simultaneous reference to those figures, FIG. 1(A) illustrates a configuration in which a DFOS sensor interrogator located in Node A performs a sensing function for a link AB between Node A and Node B. If there exists a cut in the sensing fiber/cable at a cut point (CP) located between Node A and Node B, the section between Node A and CP can still be detected, but the section between CP and Node B cannot be detected, as shown illustratively in FIG. 1(B). Accordingly, and as will be understood and appreciated, a protection mechanism is needed to allow detection of the CP-B section when such discontinuity (fiber cut) occurs.

In a contemporary fiber optic network protection configuration, if one link fails (such as experiencing a cable cut) between two nodes, an alternative route that does not involve the damaged link is selected, configured, and made operational to maintain communication between the two nodes. In other words, the exact routing arrangement is not important, so long as there is at least one operational link between a source node and a destination node—regardless of route taken.

Unfortunately, however, such is not the case with an IaaSr fiber sensing network. In such a sensing network, the specific route is critical since the specific fiber serves as sensing media and its specific location (route) determines where such sensing occurs. Accordingly, any protection solution for IaaSr cannot simply discard a damaged link and replace it with another fiber route (link).

Such protection can however instead be provided by adding a sensing function from an opposite end of a failed link (route). As shown in FIG. 1(C), after the link AB is cut at the point CP, a second sensor interrogator is placed at Node B (or alternatively an existing, redundant system is made operational), and provides the sensing functionality for section B-CP. Therefore, the entire link AB can still be monitored in its entirety, with A-CP section information obtained by the interrogator located in Node A, and B-CP section information obtained by the interrogator located in Node B. Advantageously, a network operator can "stitch" or otherwise combine (physically and/or logically) the data from these two sensors together to produce the overall sensing result for the entire link—except the very small section at the fiber cut location.

From this discussion it may be apparent to those skilled in the art that a relatively straightforward solution to achieve IaaSr network link protection is to dedicate a backup DFOS interrogator at an opposite end of every sensing route (could be a route over multiple links). Unfortunately, this is not a cost-effective solution as it will potentially double the number of sensor interrogators employed in the system—while half of them serve as backup and are not used during a normal operation time.

A more economical approach is to share backup DFOS interrogators among all routes. In this way, the hardware cost (capital expenditure) will be lowered as the number of necessary DFOS interrogators (primary working ones and backup ones) is minimized, while any link failure can be circumvented. Such a shared arrangement is known in the art as a "shared protection scheme" and—until now—there is no known method to optimize DFOS placement for such shared a protection scheme.

Such DFOS placement is now described according to aspect of the present disclosure which advantageously defines a DFOS placement such that it is tolerant of/immune from single link failure.

The problem of reliable DFOS placement against single link failure can be defined as follows. We are given a network infrastructure G(V, E), where V is the set of end nodes, and E is the set of optical fiber links that connects those end nodes. G is subjected to single link failure, e.g., fiber cut. The reliable DFOS placement problem is to find out the assignment of both primary and backup DFOS assignment (including sensor placement and fiber sensing routes for both primary and backup DFOS) to survive against single link failure and continue to provide IaaSr services without interruption, with the objective of minimizing the consumption of the number of sensors.

Figure 2:
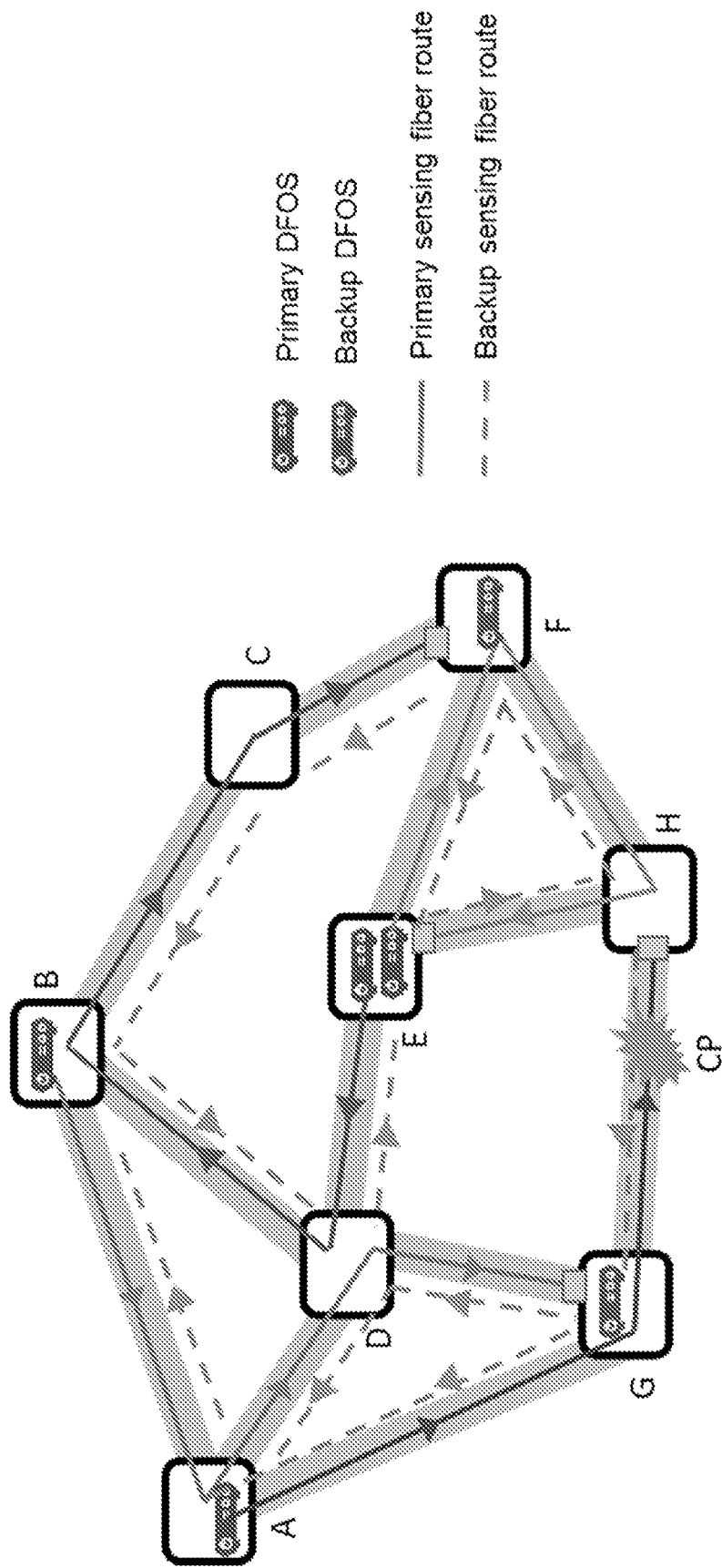
FIG. 2 is a schematic diagram illustrating reliable DFOS placement in an optical network according to aspects of the present disclosure.

FIG. 2 is a schematic diagram illustrating reliable DFOS placement in an optical network according to aspects of the present disclosure. As shown in FIG. 2, four DFOS sensors are deployed at Nodes A, B, E (note that there are two sensors at Node E) as the primary sensors. The corresponding primary fiber sensing routes are {A: A-G-H}, {B: B-A-D-G}, {E1: E-F-H-E}, and {E2: E-D-B-C-F}. From the figure we can observe that all links are sensed (or covered) by this primary DFOS assignment.

Assume now that the optical network infrastructure arrangement illustratively shown in the figure is subjected to a single link failure, e.g., the cut point (CP) between node G and H. To provide reliable IaaSr service, two backup DFOS sensors are deployed at node F and G. Since they are for backup protection purpose, the corresponding backup fiber sensing routes exhibit a tree-like structure (topology), rather than linear routes.

In this way, a backup sensing route tree can provide backup protection to several primary fiber sensing routes. In other words, it is a shared protection scheme, which may yield to a more efficient resource consumption in terms of the number of sensors used.

With continued reference to FIG. 2, we note that the backup fiber sensing trees are {G: GAB-GDA-GDE} and {F: FCBD-FEHF-FEHG}. In case of a single link failure (e.g., fiber cut), the original primary sensor will continue to sense its assigned link(s) as much as possible, while a backup sensor and a branch on the corresponding backup fiber sensing tree will be used to recover sensing service for the remaining segment of the broken link from the opposite direction as compared to the primary sensing route.

For example, in the configurations shown illustratively in FIG. 2, if there is a link failure at link G-H (e.g., a fiber cut point denoted by CP), the primary sensor at node A will continue to sense the path A-G-CP, while backup sensor F will be used to provide backup sensing service to path F-E-H-CP, thus any IaaSr service can continue to function on all the links (including the broken link G-H) on the network infrastructure. In this example, links E-F and E-H are sensed by both the primary sensor in Node E and the backup sensor in Node F in opposite directions. Advantageously, this will not cause any data confusion or conflict.

Our inventive method and resulting DFOS configuration(s) according to aspects of the present disclosure advantageously provide reliable yet cost efficient IaaSr service or DFOS assignment against single link failure. In particular, our method allows the backup DFOS resources to be shared among multiple primary DFOS assignments, thus achieving a cost-efficient way of providing reliable IaaSr service. Furthermore, our method treats the assignment of primary and backup DFOS equally, and determines these assignments as a one-step global optimization, thus achieving a close-to-optimal result in terms of the number of DFOS sensors used.

Our inventive method and procedures according to aspects of the present disclosure generally involve three sub-procedures. First, our inventive method according to aspects of the present disclosure identifies all possible fiber sensing routes (constrained by the sensing range limit) on each node and considers them as candidates for primary DFOS assignment. Second, our inventive method according to aspects of the present disclosure identifies all possible fiber sensing route trees (constrained also by the sensing range limit) on each node and considers them as candidates for backup DFOS assignment. Finally, our inventive method according to aspects of the present disclosure considers primary DFOS candidates and backup DFOS candidates equally and applies a greedy algorithm to select the minimum set of DFOS assignment from the primary candidates and backup candidates, such that each link is sensed (or covered) at least once from each direction.

In the meantime, our inventive methods according to aspects of the present disclosure ensures that, on a particular link that are shared by multiple primary fiber sensing routes, the number of backup fiber sensing services is greater than or equal to the number of primary fiber sensing services, so that each primary fiber sensing service will have at least one backup fiber sensing service when single link failure occurs.

Figure 3:
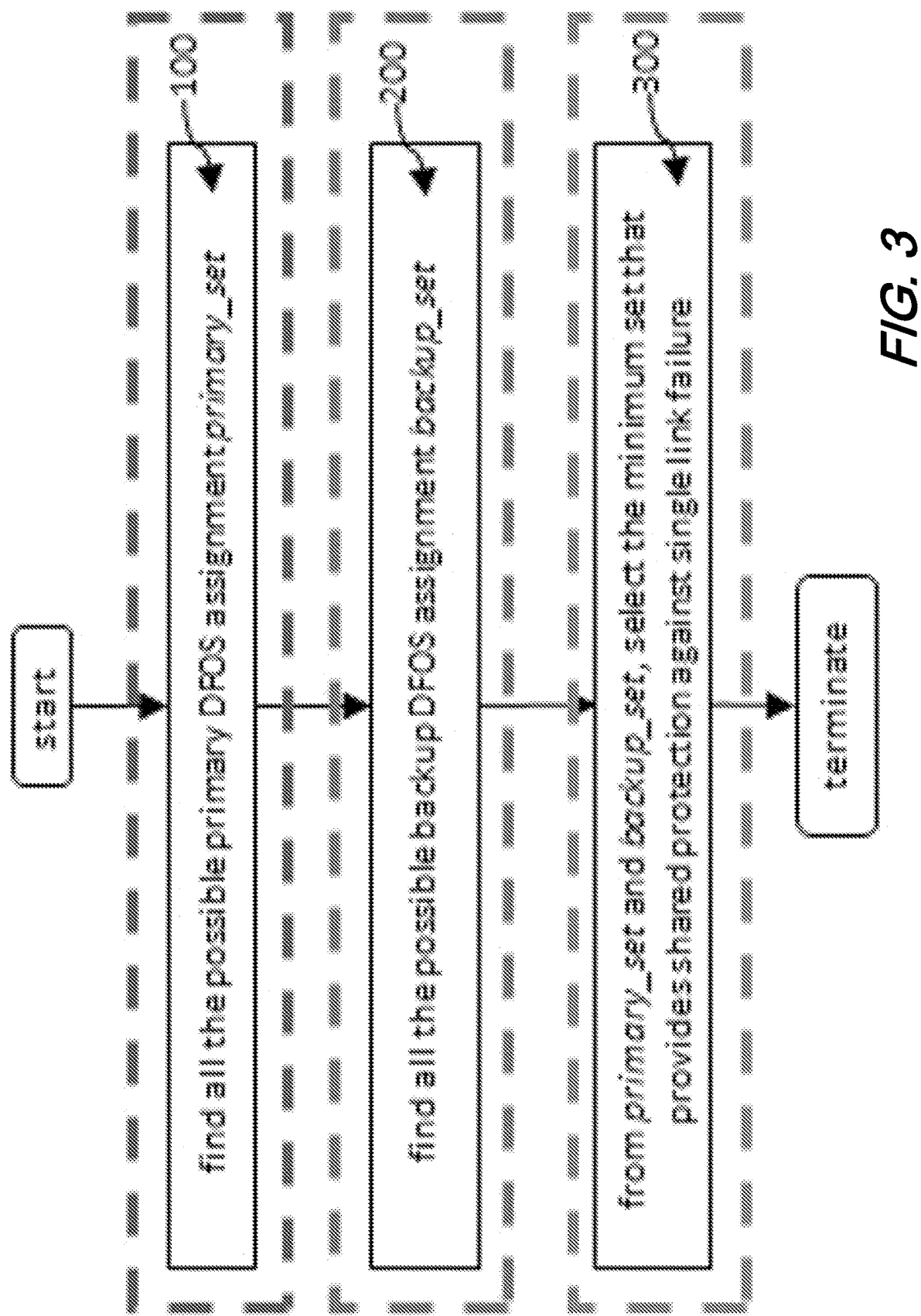
FIG. 3 is a flow diagram illustrating an overview of a placement procedure according to aspects of the present disclosure.
Figure 4A:
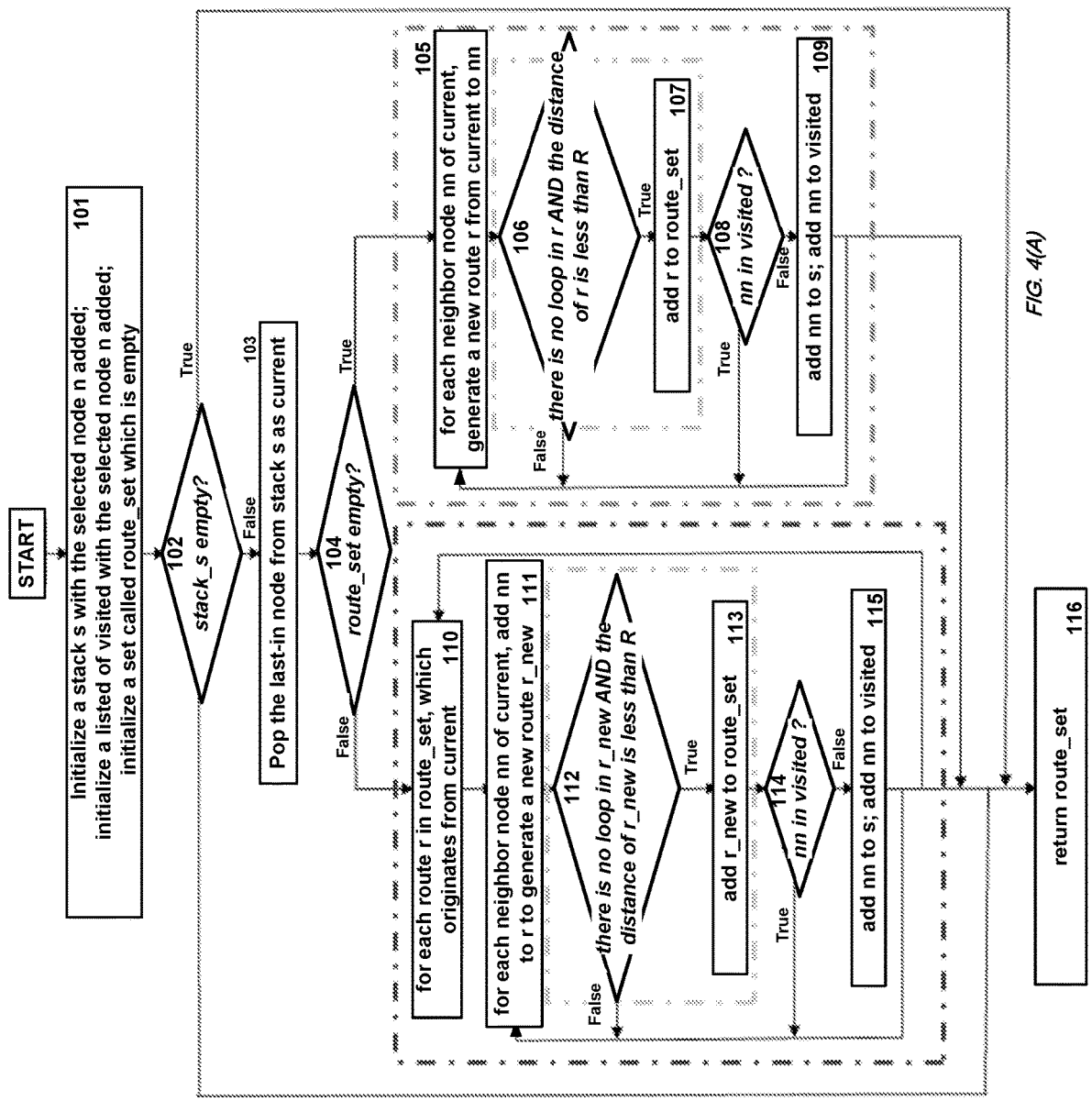
FIG. 4, FIG. 4(A), FIG. 4(B), and FIG. 4(C) are series of flow diagrams illustrating overall operation of the first sub-procedure of FIG. 3 according to aspects of the present disclosure.
Figure 4B:
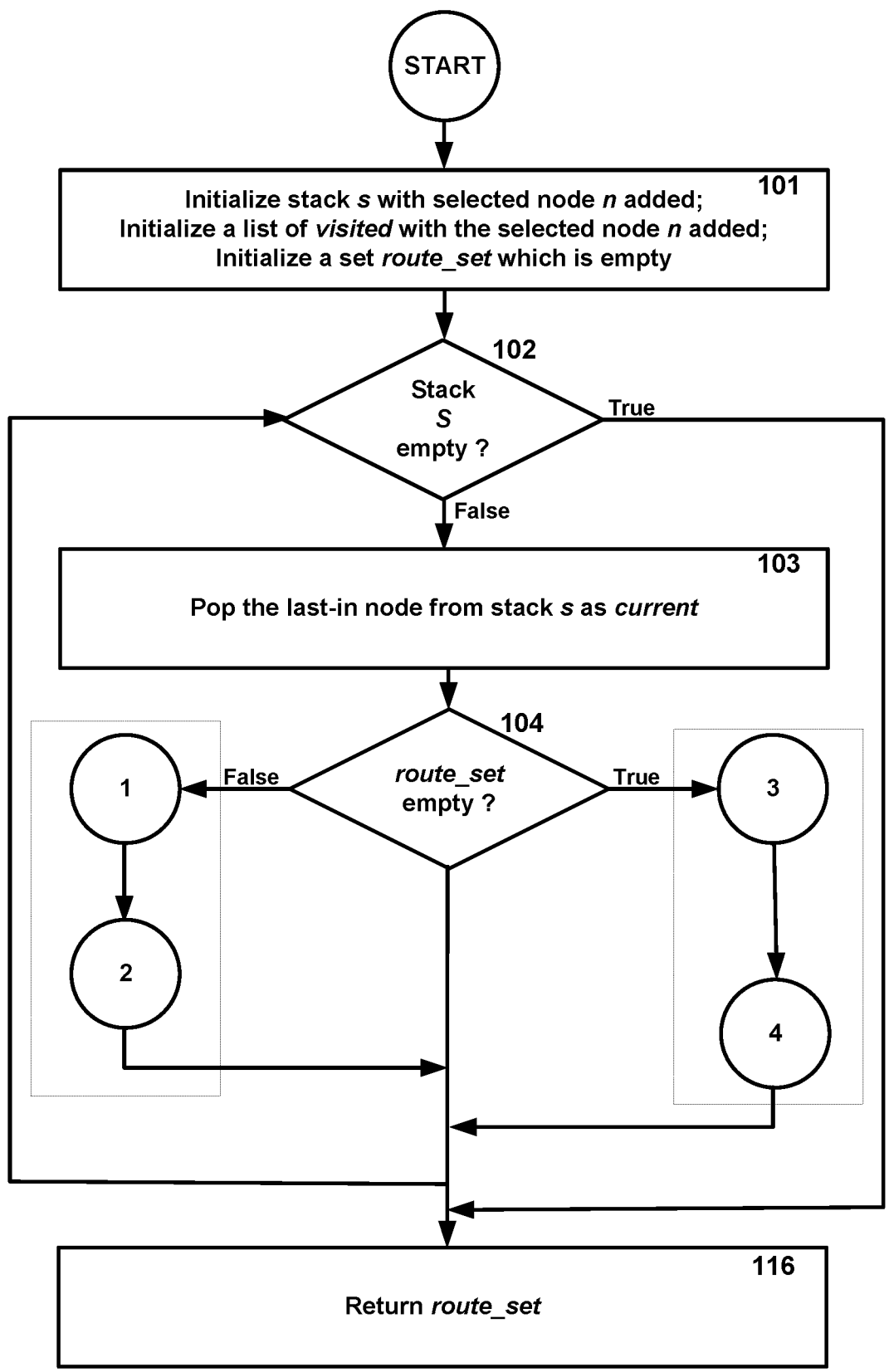
Figure 4C:
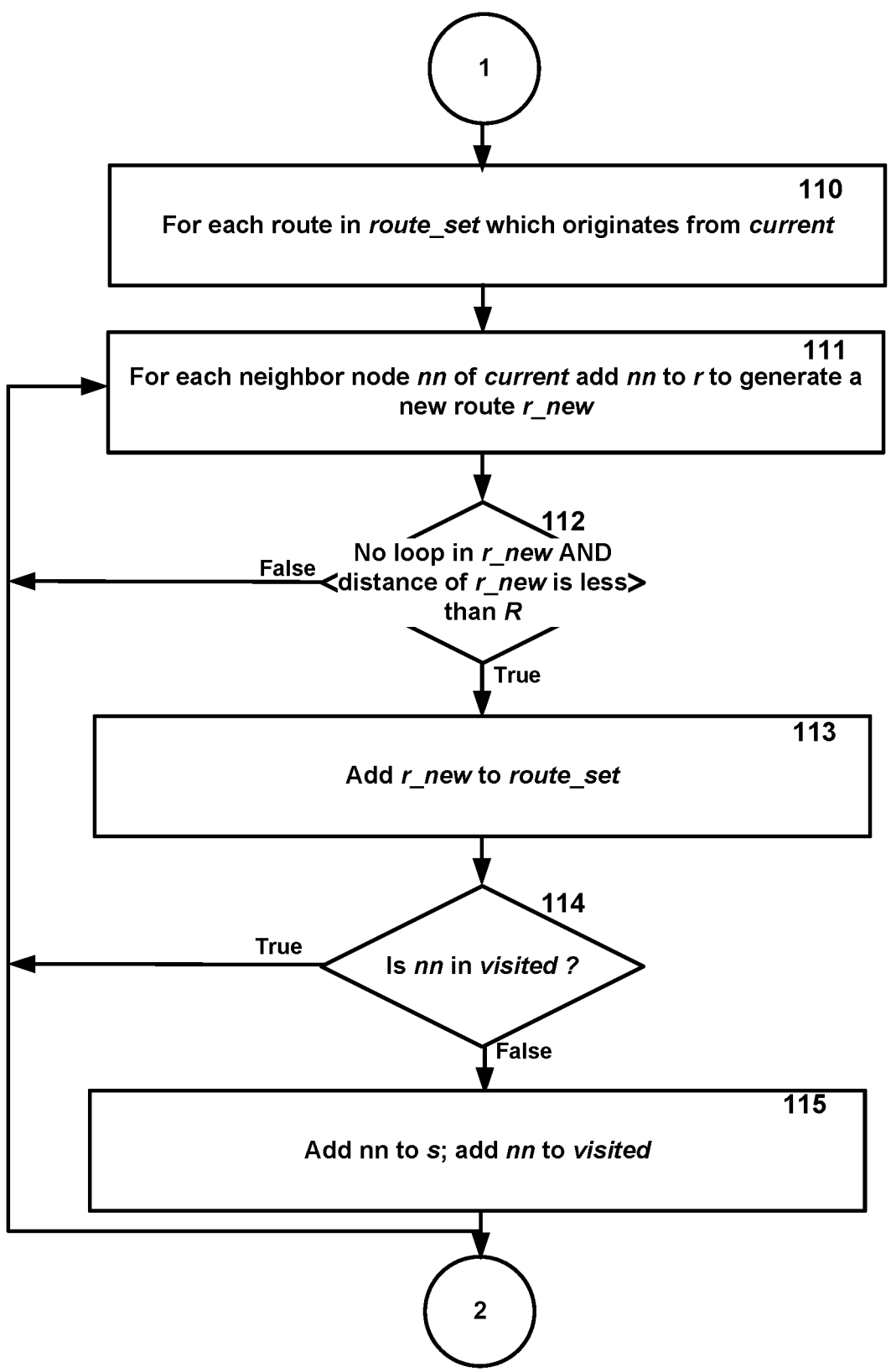
Figure 4D:
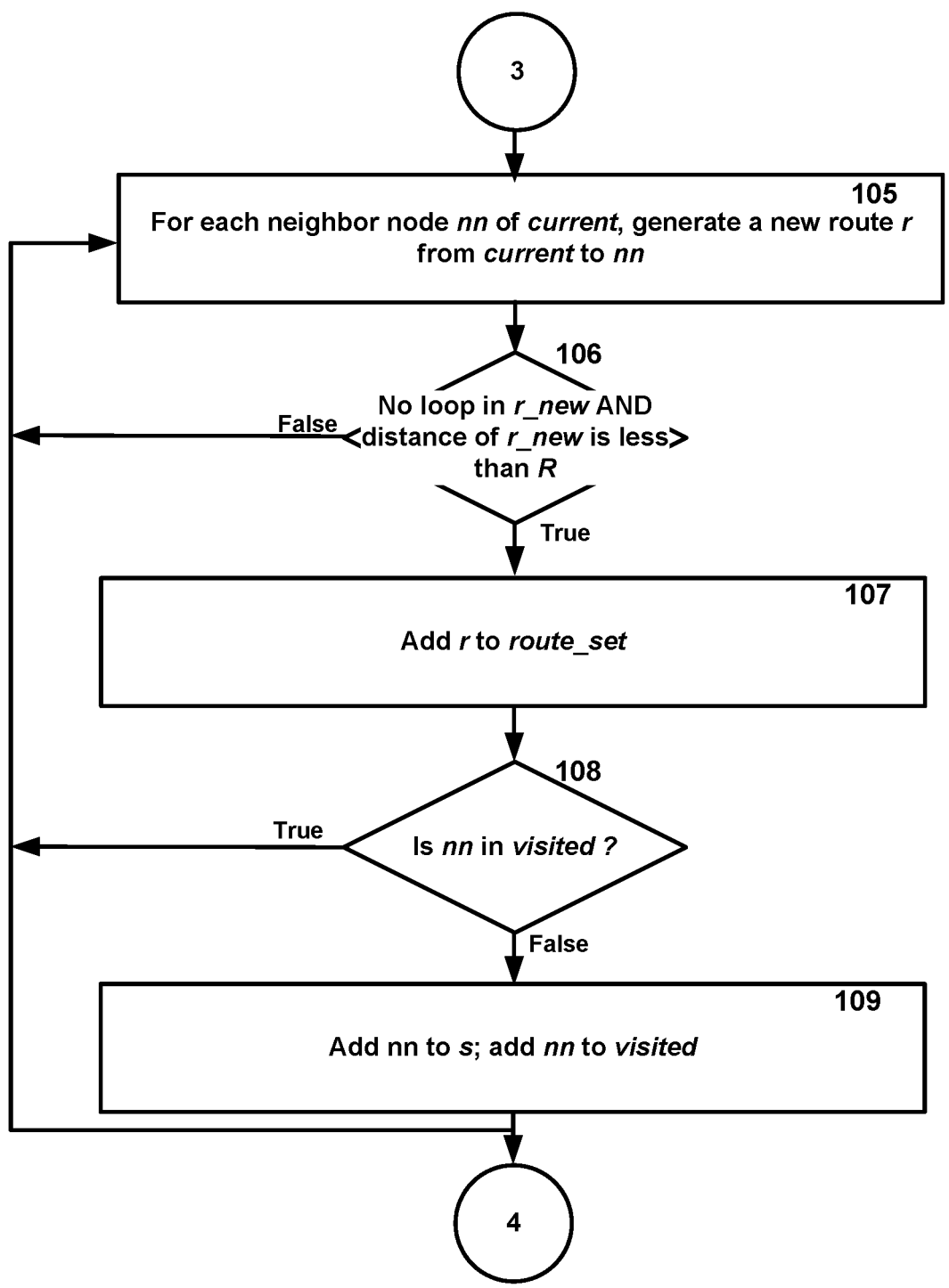

FIG. 3 is a flow diagram illustrating an overview of a placement procedure according to aspects of the present disclosure. With reference to that figure, it may be observed that our inventive method/procedure may be generalized into three sub-procedures, which are illustratively indicated as steps 100, 200 and 300, as shown in FIG. 3.

Step 100, the first sub-procedure, explores all possible primary DFOS assignments and stores them in a set called primary_candidates, which will be used as one input for a third sub-procedure at Step 300.

Step 200, the second sub-procedure, explores all possible backup DFOS assignments and stores them in a set called backup_candidates, which will be used as another input for the third sub-procedure at Step 300.

Step 300, the third sub-procedure takes outputs from Step 100 and Step 200, and applies a greedy algorithm to select a minimum set from primary_candidates and backup_candidates, which will cover each link at least once from each direction of a link, thus providing protection for reliable IaaSr services against single link failure.

The first sub-procedure (i.e., Step 100) includes 16 steps as follows, the flowchart of which is shown in FIG. 4, FIG. 4(A), FIG. 4(B), and FIG. 4(C).

Step 101 is the initialization step of the sub-procedure of depth-limited route exploration. Three data structures are created and initialized. First, a stacks is created to store all identities of all nodes that need to be visited for a given node n. The stack is initialized with the given node n, and to it is added any additional nodes when the additional nodes meet certain conditions (see Steps 106 and 108, and Steps 112 and 114).

Second, a list called visited is initialized to keep track of nodes that have been visited during a depth-limited route exploration process. This ensures that there are no duplicated sensing route(s) in a final DFOS assignment.

The list is initialized to contain the given node n. Finally, a set called route_set is initialized as empty, which contains all possible fiber sensing routes (linear routes) if a sensor at the given node n is deployed.

Step 102: is the entering point of a while loop. It performs a check to determine if stack s is empty or not. If the stack is not empty, control enters the while loop and continues to Step 103. If the stack is empty, it forces a quit of the while loop and transfers control to Step 116 and returns the route_set for the given node n. Here, when the stack is empty, it means that all the neighboring nodes that are within the sensing limit for the given node n have been checked, so route_set contains all possible sensing routes for the given node n.

Step 103 pops the last-in node from stack s and denotes it as node current. This current node indicates where the current exploration is located at. Future steps determine whether or not to add current and its neighbors as possible sensing routes in route_set.

Step 104 checks if set route_set is empty or not. If it is empty, node current is the original node of the sensing route and operation will further explore any other possible sensing routes, as Step 105. If route_set is not empty, then operation checks the routes from route_set whose predecessor is current, and further explore any other possible sensing routes, a operation proceeds to Step 110.

Step 105 is the entry point of a for-loop. We need to check each neighbor node nn of current and generate a route r from current to nn. This route will be checked in step 106 to determine whether it will be added to route_set.

Step 106 checks the condition of route r that is extended from current to nn. A qualifying condition is that route r must be a linear route that contains no loop, and in the meantime, the distance traveled by r is less than the sensing range limit. If route r satisfies the above conditions, we will add r to route_set as shown in Step 107. If the condition is not met, the procedure will return to Step 105 and check the next neighbor node and its corresponding newly generated route.

Step 107 adds the route r to the set of route_set.

Step 108 checks if neighbor node nn has been visited or not. If nn has been visited before, then control returns to Step 105 and checks the next neighbor node. If nn has not been visited, then control continues at Step 109.

Step 109 adds neighbor node nn to stack s, which allows further exploration of any other possible sensing routes extended from this node. In this step, nn is added to the list of visited nodes.

Step 110 is executed when the condition in step 104 is not met. It is the entering point of the outer loop of a double for-loop. Here, we need to check each existing sensing route r in the set of route_set, and proceed with the ones that originate from node current.

Step 111 is the entry point of an inner loop of a double for-loop. At this point in the procedure we need to check each neighbor node nn of current and generate a new route r_new that is constructed by adding node nn to existing sensing route, r.

Step 112 this step checks whether or not route r_new is a linear route without a loop, and in the meantime, the distance traveled by r_new is less than the sensing limit. If the above condition holds true, then control proceeds at Step 113, where r_new is added to route_set. If the condition is not met, the procedure will return to Step 111 and check the next neighbor node and its corresponding newly generated route.

Step 113 adds the route r_new to the set of route_set.

Step 114 checks if neighbor node nn has been visited or not. If nn has been visited before, then control returns to Step 111 and checks the next neighbor node. If nn has not been visited, then control proceeds at Step 115.

Step 115 adds neighbor node nn to stacks, which allows further exploration of any other possible sensing route extended from this node. In this step, nn is added to the list of visited.

Step 116 is executed when the condition in Step 102 holds true. It returns route_set to where the procedure was called in the first sub-procedure in Step 100.

Figure 5:
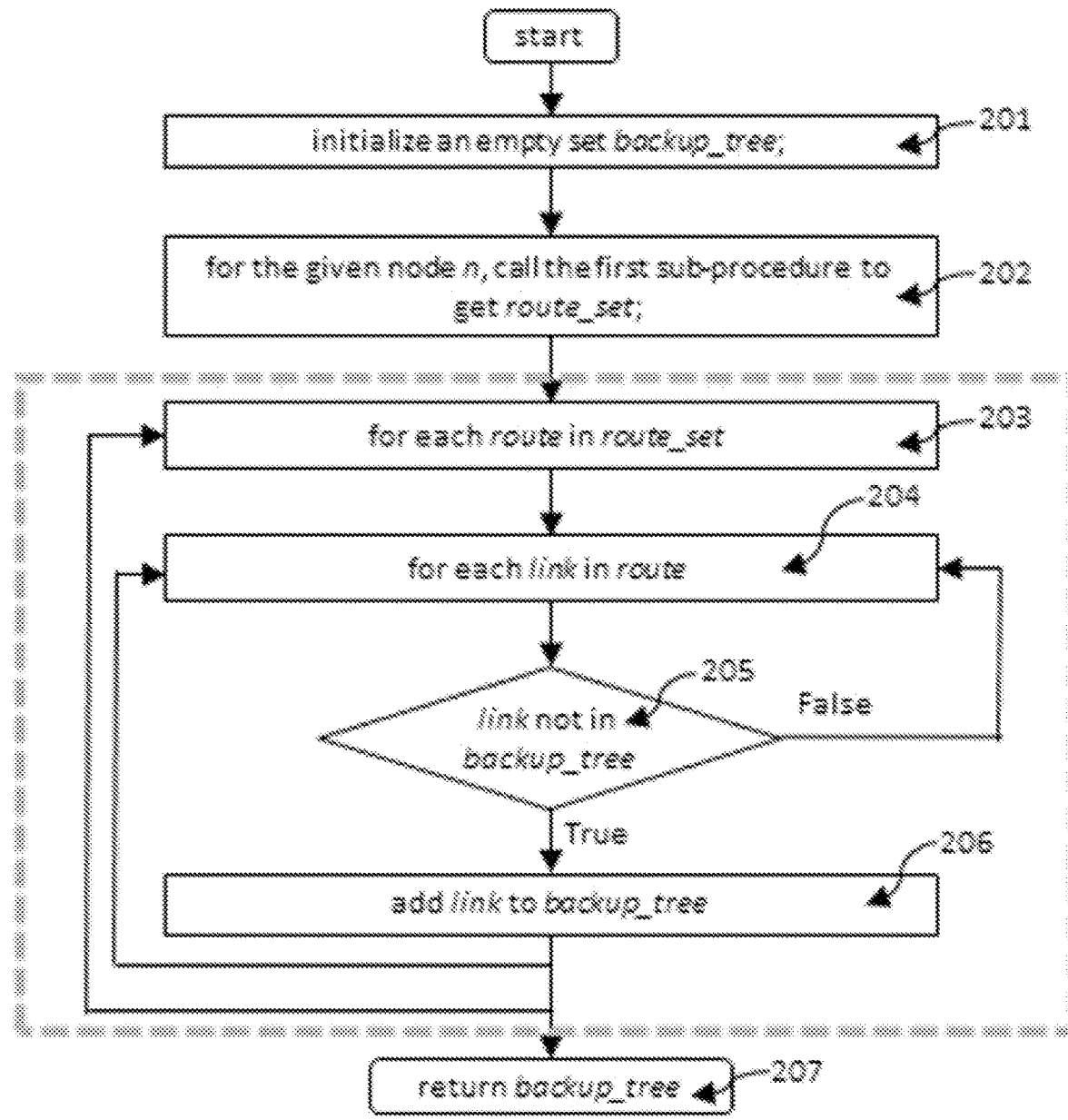
FIG. 5 is a flow diagram illustrating overall operation of the second sub-procedure of FIG. 3 according to aspects of the present disclosure.
Figure 6A:
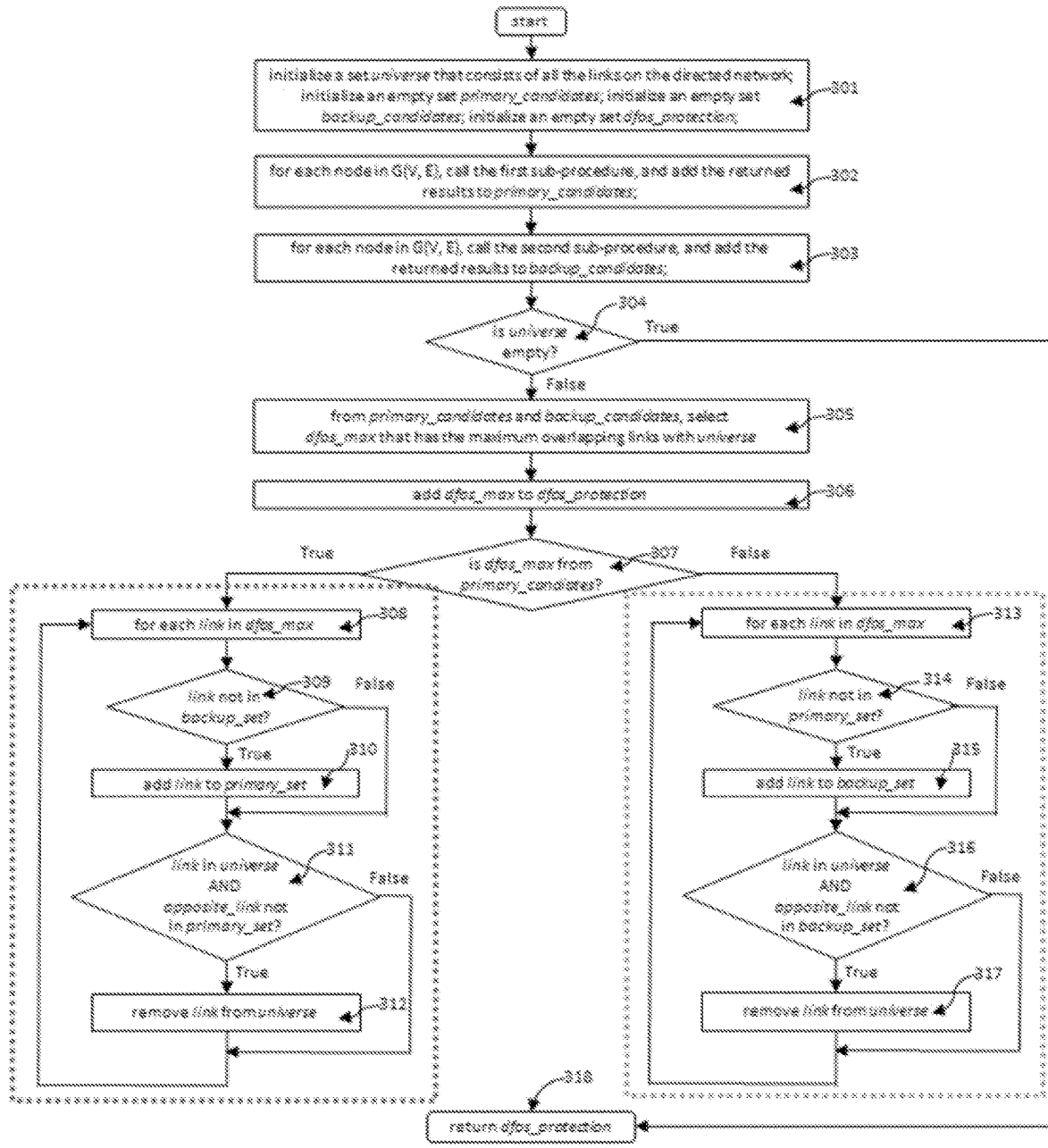
FIG. 6, FIG. 6(A), FIG. 6(B), and FIG. 6(C) are series of flow diagrams illustrating overall operation of the third sub-procedure of FIG. 3 according to aspects of the present disclosure.
Figure 6B:
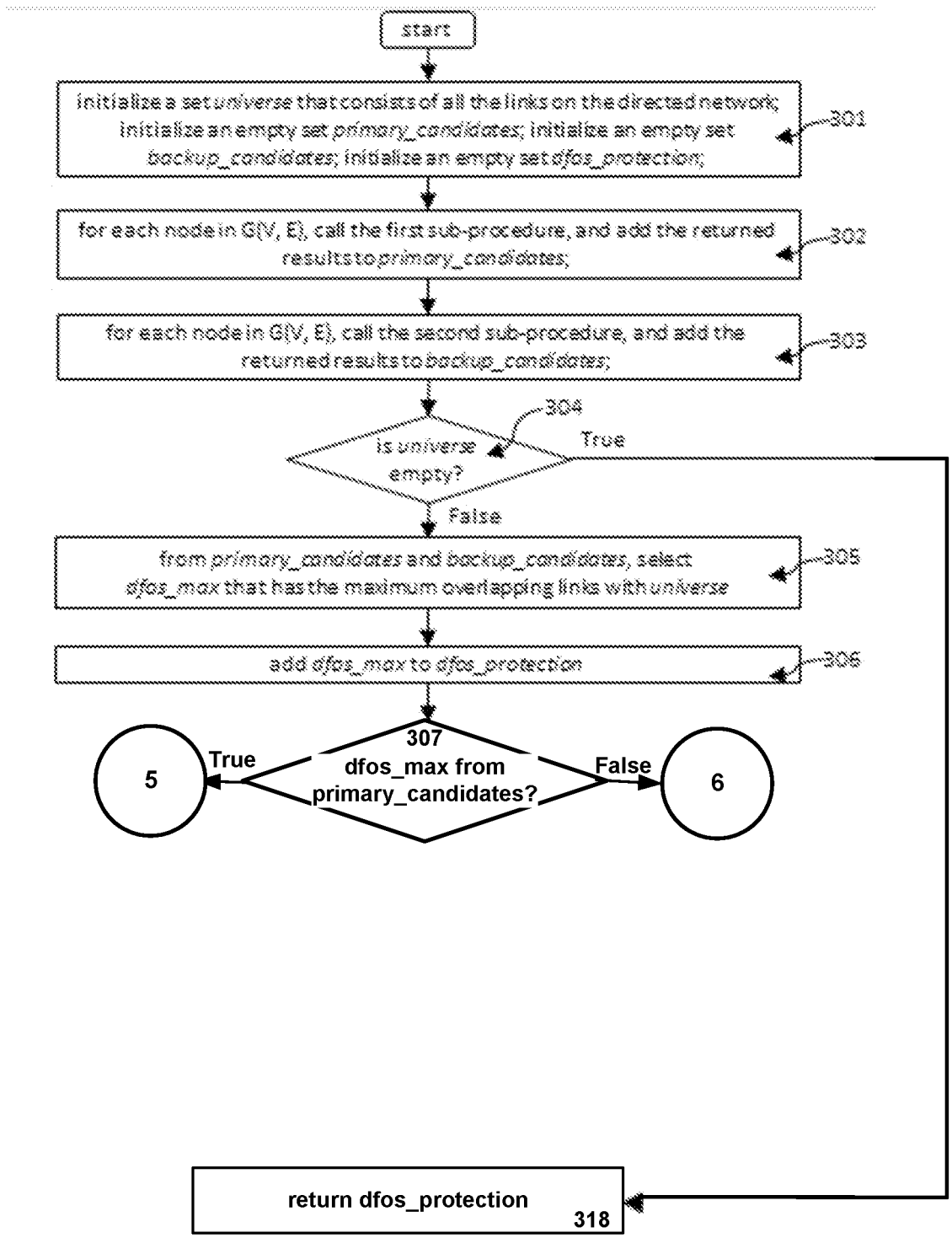
Figure 6C:
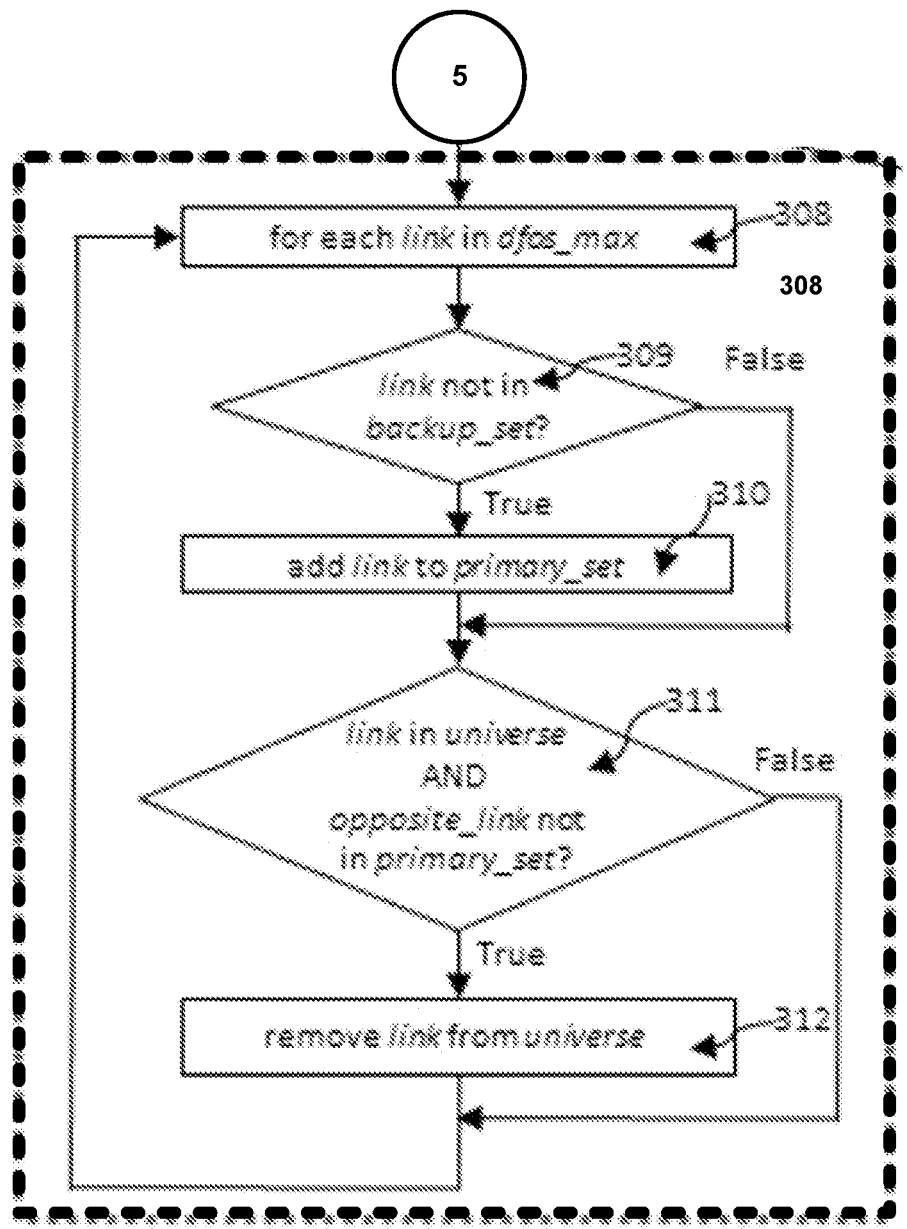
Figure 6D:
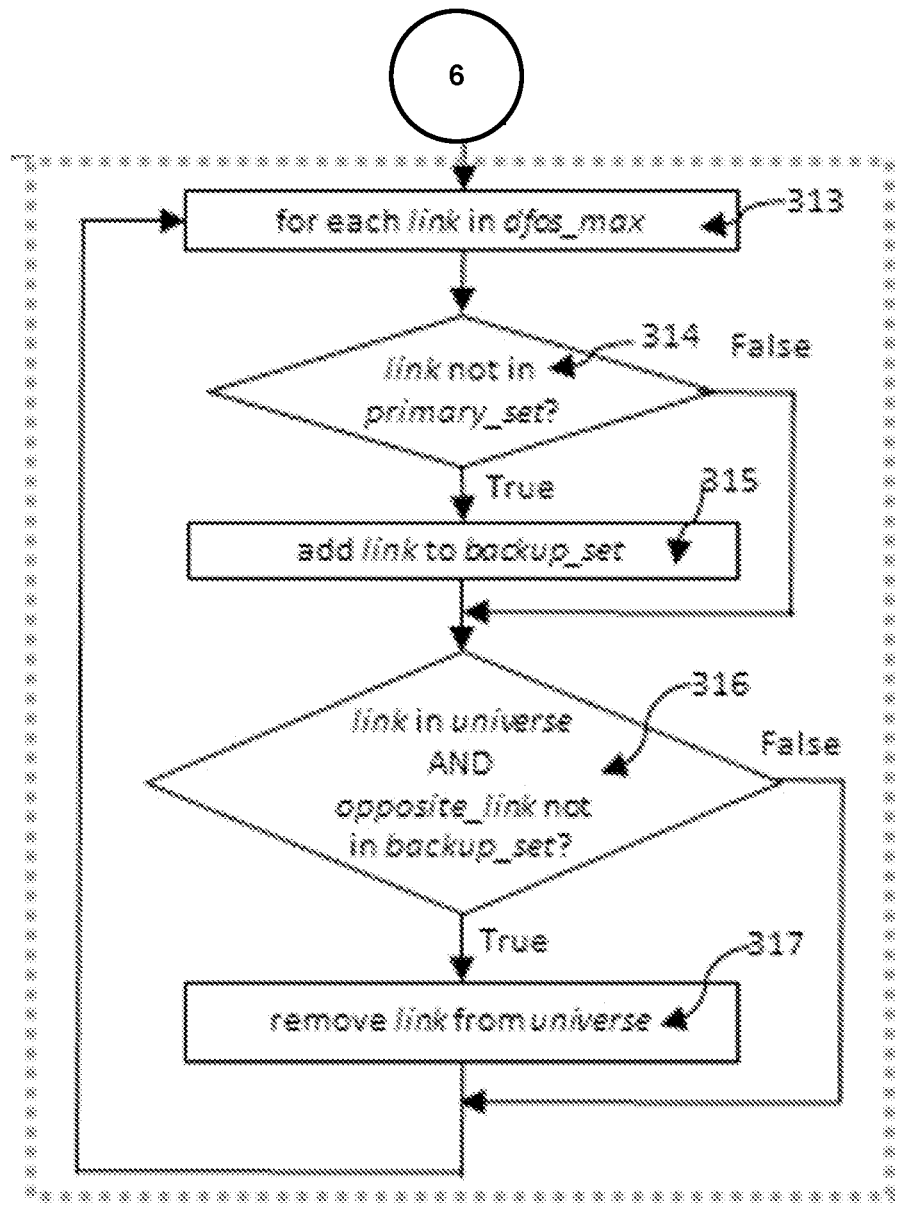

The second sub-procedure (i.e., Step 200) includes a number of steps as follows, the flowchart of which is shown in FIG. 5.

Step 201 is the initialization step of the second sub-procedure. A set called backup_tree is created to store the backup fiber sensing routing tree if a backup sensor is deployed at the given node n.

Step 202 calls the first sub-procedure to facilitate all the possible fiber sensing routes for the given node n. The result is denoted as route_set.

Step 203 is the entry point of an outer for-loop. It will check each route in route_set and repeat Step 204 through Step 206. If all route items in route_set have been checked, go to Step 207.

Step 204 is the entry point of an inner for-loop. It checks each link traveled through by the selected route and repeats Step 204 and Step 205. If all link items in route have been checked, control returns to Step 203.

Step 205 checks if the selected link does not exist in backup_tree yet. If the link does not exist in backup_tree yet, control is transferred to Step 206; otherwise, control is transferred to Step 204.

Step 206 adds the selected link to backup_tree.

Step 207 returns backup_tree to where the second sub-procedure is called.

The third sub-procedure of our inventive method (i.e., Step 300) includes 18 steps as follows, the flowchart of which is shown in FIG. 6, FIG. 6(A), FIG. 6(B), and FIG. 6(C).

Step 301 is the initialization step of the third sub-procedure. Three data structures are created and initialized. First, a set called universe is created and initialized to contain all the links (both directions) in the given network G. Second, a set called primary_candidates is initialized as empty, which will store all the possible primary DFOS assignment. Thirdly, a set called backup_candidates is initialized as empty, which will store all the possible backup DFOS assignment. Finally, a set called dfos_protection is initialized as empty, which will store the assignment of reliable DFOS assignment (including both primary and backup DFOS assignments) that provides shared protection against single link failure.

Step 302 calls the first sub-procedure for each node in the network G(V, E), and add the returned results to primary_candidates.

Step 303 calls the second sub-procedure for each node in the network G(V, E), and add the returned result to backup_candidates.

Step 304 is the entry point of a while-loop. If universe is empty, control is transferred to Step 318; otherwise, repeat Step 305 through Step 317.

Step 305 examines each candidate from primary_candidates and backup_candidates, and selects the DFOS assignment dfos_max, which has the maximum overlapping links with universe.

Step 306 adds the above selected dfos_max to the final reliable DFOS assignment result dfos_protection. Note that this dfos_max can be either a primary DFOS assignment or a backup DFOS assignment, which means that the proposed procedure treats them equally without prioritizing primary DFOS assignment over backup DFOS assignment. As a result, the allocation of primary and backup DFOS is obtained in a global optimization manner in one-step, which is more efficient than any two-step approach that provisions primary DFOS assignment first followed by the backup DFOS assignment or vice versa.

Step 307 checks if the above selected dfos_max is from primary_candidates or backup_candidates. If it is from primary_candidates, the procedure proceeds to Step 308; otherwise, the procedure goes to Step 313.

Step 308 is the entry point of a for-loop. It will check each link in dfos_max and repeat from Step 309 to Step 312.

Step 309 checks if link does not exist in backup_set. If link does not exist in backup_set, the procedure transfers control to Step 310; otherwise, the procedure transfers control to Step 311.

Step 310 adds the given link to primary_set.

Step 311 checks if link (e.g., (i,j), where i and j are network nodes) exists in universe, and in the meantime, the opposite direction link opposite_link (e.g., (j,i)) does not exist in primary_set. If true, the procedure transfers control to Step 312; otherwise, the procedure returns to Step 308.

Step 312 removes link from universe.

Step 313 is the entry point of a for-loop. It checks each link in dfos_max and repeat from step Step 314 to Step 317.

Step 314 checks if link does not exist in primary_set. If link does not exist in primary_set, the procedure transfers control to Step 315; otherwise, the procedure transfers control to Step 316.

Step 315 adds the given link to backup_set.

Step 316 checks if link (e.g., (i,j), where i and j are network nodes) exists in universe, and in the meantime, the opposite direction link opposite_link (e.g., (j,i)) does not exist in backup_set. If true, the procedure continues at Step 317; otherwise, the procedure transfers back to Step 313.

Step 317 removes link from universe.

Step 318 returns results in dfos_protection and the procedure terminates.

Figure 7:
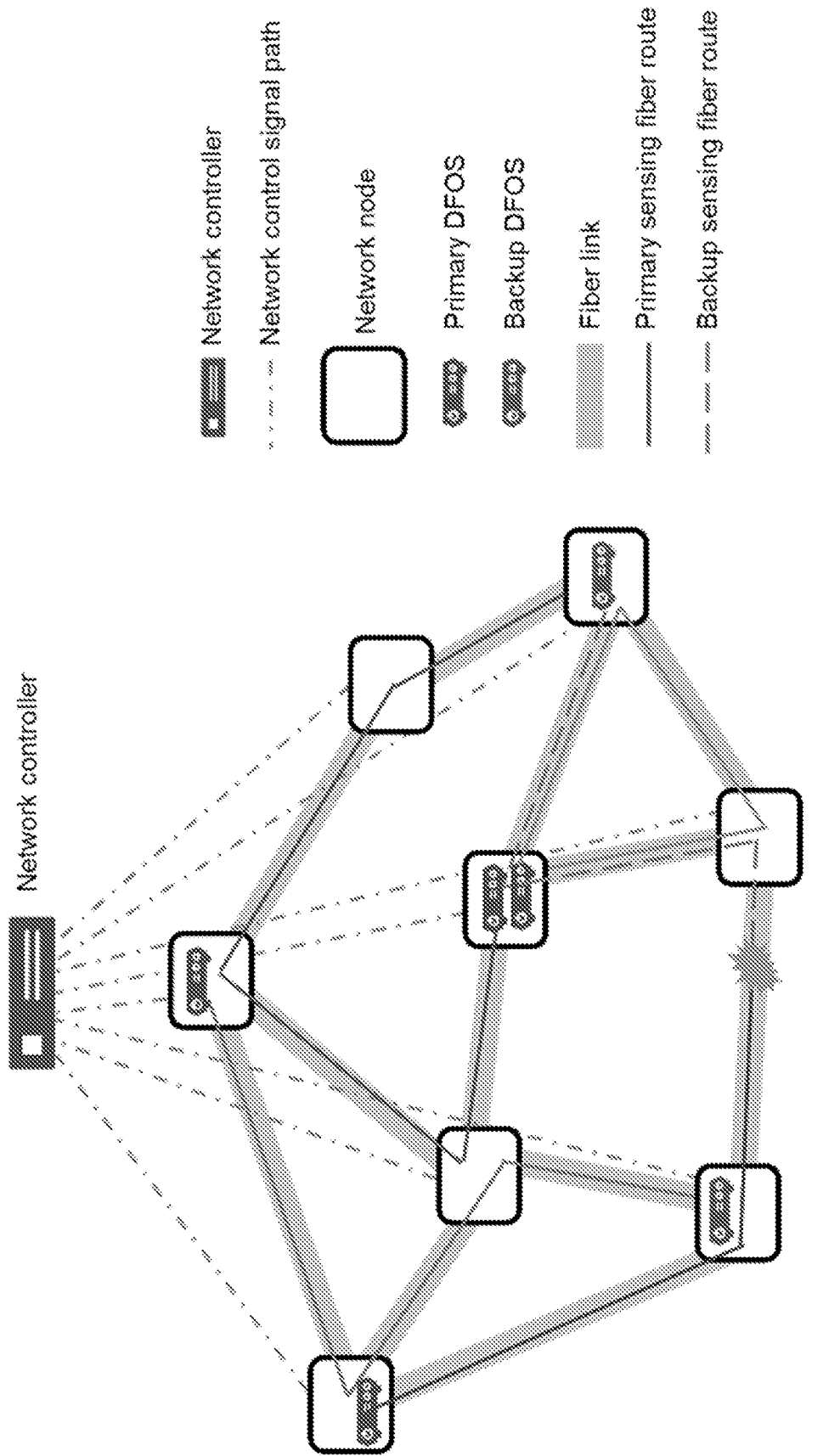
FIG. 7 is a schematic diagram illustrating application of reliable DFOS placement with shared protection in a fiber optic sensing network according to aspects of the present disclosure.

The application of one-step DFOS placement with shared protection FIG. 7 shows the application of the proposed one-step DFOS placement with shared protection procedure.

There are multiple nodes in the fiber optic network, and there are multiple fiber optic links between pairs of nodes. The yellow fiber optic links are those links that need to be monitored (sensed) by the DFOS sensors (they could include all of the fiber optic links in the network).

These optical nodes are controlled by a network controller, which can be placed at one of the nodes, or can be in a remote location or multiple locations. The network information, including the network topology, information of each node, information of each link (such as the two end nodes, the link distance, whether sensing is required on this link), and so on, are collected by the network controller. Based on the information, the network controller uses the one-step DFOS placement with shared protection procedure to decide the network configuration for sensing purpose. The configuration settings are then sent to individual nodes.

When an optical node receives the respective network configuration instructions, it executes the instructions, which could include placing one or more DFOS sensor hardware at the node and connecting them to the respective fiber, and/or connect two fibers from two links together to form a pass-through path (this can be done via a fiber patch panel or optical switch), and/or terminate a fiber to prevent large reflection at the end surface of the termination point.

Each deployed DFOS sensor also use the instruction from the network controller to configure the sensing distance and any related parameters, then start the on-going measurement. The collected data are separated into individual links, if the sensor's sensing range spans across multiple hops. The measure data for each fiber link can be stored and processed locally or can be sent to remote or centralized processor to be analyzed or stored.

When a cable failure occurs (such as buried cable cut by illegal or improper construction, buried cable cut by earthquake, overhead cable cut by falling tree, or overhead cable cut by traffic accident that breaks the utility pole supporting the cable), it is detected immediately by the corresponding DFOS sensor that monitors this route, since there is a loss of the backscattering signal and abnormal sensor data. Due to the operation principle of backscattering-based DFOS, in which the signal location is clearly distinguished through the time-of-flight calculation, the location of the cable failure can be identified easily. This information is then sent to the network controller.

Based on the pre-determined backup route assignment plan provided by the proposed shared protection procedure, the network controller assigns the backup DFOS sensor(s) and the corresponding backup route(s), and sends the information to the respective nodes. The backup DFOS(s) is then operated, and corresponding routes are configured through optical switches at the intermediate nodes. The sensing network can then provide the sensing service on the backup route(s), which includes the remaining part of the route that was cut.

The network controller also coordinates the data processing between the primary sensor and the backup sensor that operate on different part of the affected route from opposite direction, and stitch the sensing data from two sensors together, so that the user can still receive a smooth, almost seamless sensing result for this route.

Besides seamless data in the spatial domain (along the fiber route), the data in time domain is also almost seamless, because the backup route selection time and configuration time are very short due to automated control. Therefore the user will still receive continuous, uninterrupted sensing service, and will not miss any events on the network.

Concurrently, the network controller will notify the network operator about the cable cut with detailed location information, so that the network operator can take action to do the repair.

Due to the resource optimization advantage of the protected DFOS placement procedure, the total number of the primary DFSO sensors and the backup DFOS sensors in the network can be kept low, saving the hardware expense. This automatic procedure is very efficient, which can reduce the network planning time significantly, especially when compared to manual planning. Therefore, it advantageously reduces operation cost.

Since all the required links in the network are performing sensing function continuously, even after a cable failure, the IaaSr (NaaSr) function is achieved and maintained, which will improve the network operation efficiency (such as early warning of potential cable damage, monitoring cable health, monitoring operation environment), and bring new service and revenue to the network owner (such as providing traffic information to municipal government, monitoring road condition for highway operator, monitoring utility pole health for utility company, monitoring city noise for accident detection, etc.)

Problem Statement and Integer Linear Programming Formulation

The problem of survivable DFOS placement against single link failure can be defined as follows. We are given a network infrastructure G(V,E), where V is the set of end nodes, and E is the set of optical fiber links that connects those end nodes. G is subjected to single link failure, e.g., fiber cut. The survivable DFOS placement problem is to find out (1) the placement of both primary and backup DFOS sensors and (2) the routing of primary fiber sensing channel and the backup fiber sensing tree channels, with the objective of minimizing the number of sensors used. In this process, we need to consider the sensing range constraint in a sense that each sensor can sense data in a single-direction with a limited sensing range, e.g., 80 km.

Here, we use integer linear programming (ILP) to formulate the survivable DFOS placement problem to facilitate the optimal shared protection solution. The following parameters are given:

G(V,E): the network infrastructure, where V is the set of nodes and E is the set of links;

R: the sensing range limit;

$d_{i,j}$: the distance of link (i,j);

From these parameters, we can obtain $w_{i,j}$ by calculating $d_{i,j}$ IR, which represents the weight of link (i,j). We also pre-calculate the shortest paths that are within the sensing range limit R for each node, and define $t_{s,i,j}$ as 1 if link (i,j) is in the sensing range of node s; 0 otherwise.

The following boolean variables are to be determined:

$p_{s,d}$: 1 if a primary sensor is deployed at node s, with sensing channel reaches destination d; 0 otherwise;

$b_s$: 1 if a backup sensor is deployed at node s; 0 otherwise;

$r_{s,d,i,j}$: 1 if the primary fiber sensing channel route between s and d travels through link (i,j); 0 otherwise;

The ILP formulation is shown as below.

$$\min: \sum_{s,d \in V} p_{s,d} + \sum_{s \in V} b_s \quad (1)$$

-continued $$\text{subject to:} \sum_{i,j \in V} r_{s,d,i,j} - \sum_{i,j \in V} r_{s,d,j,i} = \begin{cases} p_{s,d} & i = s \\ -p_{s,d} & i = d \\ 0 & \text{otherwise} \end{cases} \forall s, d \in V \quad (2)$$

$$\sum_{i,j \in V} r_{s,d,i,j} \cdot w_{i,j} \leq p_{s,d}, \forall s, d \in V \quad (3)$$

$$\sum_{s,d} r_{s,d,i,j} + \sum_{s,d} r_{s,d,j,i} \geq 1, \forall i, j \in V \quad (4)$$

$$\sum_{s \in V} b_s \cdot t_{s,i,j} + \sum_{s \in V} b_s \cdot t_{s,j,i} \geq 1, \forall i, j \in V \quad (5)$$

$$\sum_{s \in V} b_s \cdot t_{s,i,j} - \sum_{s,d} r_{s,d,j,i} \geq 0, \forall i, j \in V \quad (6)$$

The objective is to minimize the number of sensors used, which is defined in Eq. (1). In addition, Eq. (2) represents the sensing range limit constraint that the distance of any sensing fiber route must be less than the sensing range limit R. Eq. (3) ensures that each link (i,J) can be sensed at least once from either direction. Eq. (4) makes sure that each sensing fiber route is a linear route. Eq. (5) guarantees that each link has at least one backup sensing tree cover it. Eq. (6) ensures that, for each link in E, the number of backup sensing is greater than or equal to the number of primary sensing, so that the link is protected against single link failure.

Heuristic Algorithms—Dedicated Protection and Shared Protection

Dedicated Protection

As we previously noted, a straightforward solution to achieve the IaaSr network link protection is to dedicate a backup DFOS interrogator at the opposite end of every sensing route (could be a route over multiple links). For example, a dedicated protection approach can be to use the solution in [2] to provision the fiber sensing route and allocate a primary and a backup DFOS sensors at the two ends of this route to provide a survivable DFOS placement. However, this is not a cost-effective solution because it will double the amount of sensor interrogators in the system, while half of them serve as backup and are not used during normal operation time. A more economical way is to use share the backup DFOS interrogators among all routes. In this way, the hardware cost (capital expenditure) will be lowered by keeping the number of necessary DFOS interrogators (primary working ones and backup ones) to the minimum, while any link failure can be solved.

Shared Protection

As noted previously, a shared protection scheme is illustrated in FIG. 8. To provide IaaSr services, four DFOS sensors are deployed at node A, B, E (note that there are two sensors on E) as primary sensors. The corresponding primary fiber sensing channel routes are A: A-G-H, B: B-A-D-G, E: E-F-H-E, and E: E-D-B-C-F. We can see that all the links are sensed (or covered) by this primary DFOS assignment. In practice, the network infrastructure is subjected to various hardware and/or software failures, such as a single link failure due to a fiber cut (e.g., a cut point (CP) between node G and H). When such a single link failure occurs to link G-H, the existing primary sensors can continue to collect sensing data from A-G-CP, while a backup sensor and a corresponding backup fiber sensing channel routes are required to collect sensing data from H-CP, such that link G-H is still fully sensed (or covered) from two opposite directions. In order to provide such a survivable IaaSr service, two backup DFOS sensors are deployed at node F and G. The corresponding backup fiber sensing channels are in a tree-like structure, rather than a linear route.

For example, in FIG. 8, the backup fiber sensing trees are G: GAB-GDA-GDE and F: FCBD-FEHF-FEHG. In this way, the backup sensing resources can be shared by multiple primary DFOS assignment, which may yield to a more efficient resource consumption in terms of the number of sensors used. In FIG. 8, when single link failure (e.g., cut point (CP) occurs to link G-H, the primary sensor at node A will continue to sense the channel A-G-CP, while the backup sensor at node F will be used to provide backup sensing service to channel F-E-H-CP, so that the IaaSr service can continue on link G-H. As we can see from the above example, it is actually a link protection problem to provision survivable DFOS placement, as we need to make sure each network link is sensed at least once from different direction to survive against single link failure. In the following parts, we propose three efficient heuristics in the context of share protection.

Shared Protection with Random Backup: This is a two-step shared protection scheme. First, we can apply the solution in [2] to provision the primary DFOS assignment, denoted by primary_candidates. Secondly, a random node can be selected to place a backup DFOS sensor. Accordingly, we can find out all the links that are within the sensing limit range of the selected node, which forms a backup sensing tree. The second step repeats until all the physical link can be sensed by at least one primary fiber sensing route in one direction and covered by at least a branch of the backup sensing fiber tree in the opposite direction. Hence, when a link encounters a cut point, the link can be sensed by a primary and backup DFOS sensor from two directions.

Shared Protection with Minimum Set Cover: This is also a two-step shared protection scheme. The first step is the same as in the shared protection with random backup. The second step is optimized using the greedy algorithm for minimum set cover [3]. More specifically, we can find out the backup sensing tree for each node on the network, which forms the set of backup_candidates. Then, we use the minimum set cover greedy algorithm to find out the minimum set from backup_candidates, which can cover all the links in the network in an opposite direction as provisioned in primary_candidates.

Shared Protection with One-step Optimization: The above two approaches provisions primary DFOS assignment and the backup DFOS assignment in two steps. As a result, the result is not a global optimal result. Hence, we propose another heuristic that can optimize the allocation of primary and backup DFOS assignments in one-step, which can achieve a global optimization result. More specifically, the shared protection one-step solution works on a directed graph, whose links are stores in universe. The protection is from the perspective of link protection in a sense that each link on a primary fiber sensing routes is protected by a backup sensor and one of the branches on its corresponding backup fiber sensing tree. First, we apply the solution in [2] to find out all the primary DFOS assignment. Instead of actually provisioning it, we store these assignments in primary_candidates first. Secondly, similar as the above two approaches, we find out all the possible backup DFOS assignment (including backup sensor placement and the backup fiber sensing tree routes) and denote it as backup_candidates. Finally, we use the modified minimum set cover greedy algorithm to find out the minimum set from the combination of primary_candidates and backup_candidates, which can cover all the links in the network in both directions. The modified minimum set cover greedy algorithm has two distinguished steps compared to [3], which are in the process of (1) selecting the maximum overlapping set and (2) updating the target set. First, when finding the maximum overlapping set, if the candidate is fromprimary_candidates, then we will count how many times the candidates overlap with the universe but not overlap with the opposite direction of fiber sensing routes from primary_dfos. Accordingly, if the candidate is from backup_candidates, then we will count how many times the candidates overlap with the universe but not overlap with the opposite direction of fiber sensing routes from backup_dfos. The above step will make sure that a given link is not covered by two primary (or two backup) sensing fiber tree in both directions, but by a primary and a backup sensing route from different direction. Secondly, when updating the universe we need to mark on the direction of each link, whether they are covered by primary DFOS or backup DFOS, so we create two set primary_dfos and backup_dfos to keep track of these. The detailed steps of the proposed shared protection in one-step heuristic algorithm can be found in the following pseudocode.

Numerical Results

We conduct comprehensive simulations to validate the proposed solutions. The fiber optic sensing range limit is set to be 80 km, given an existing fiber optic sensing technique. Due to this constraint, the network infrastructures we selected are regional or metro fiber optical networks using real-world datasets. The key network parameters are shown in Table 1. Note that we performed pre-processing that clips the links that are greater than the sensing range limit to be 80 km, so that those links can also be covered by DFOS sensors.

We evaluate the proposed ILP solution and the efficient heuristic solutions in terms of the number of sensors used. The results are shown in Table 2. We can see that the ILP solution provides the lower bound; however, as the network scale becomes large, it is not able to yield a result in a reasonable amount of time. Among all the heuristic algorithms, we can observe that shared protection solutions outperform the dedicated protection solution. In particular, Shared-One can achieve a performance that is close to the lower bound set by the ILP solution. Furthermore, Shared-One outperforms dedicated protection, Shared-Random and Shared-MSC by an average improvement of 27%, 20% and 16%, respectively. The reason is because Shared-One determine the allocation of primary DFOS and backup DFOS in one-step, which achieves the global optimization.

Algorithm 1

Shared Protection in One-step 1. initialize universe with all the links in the direct graph G
2. initialize dfos_primary and backup_primary as empty
3. apply EnP algorithm [2] to find primary_candidates
4. pre-calculate shortest paths for each node pair and form back_candidates
5. while universe not empty do
6.   max_overlap = 0
7.   for candidate from primary_candidates and backup_candidates do
8.     if candidates is from primary_candidates then
9.       count-overlap is overlapping links between candidate and universe exlude dfos.primary
10.      If count_overlap ≥ max_overlap then
11.        max_overlap = count_overlap
12.        max_candidate = candidate
13.      end if

Algorithm 1 (continued)

Shared Protection in One-step 14.    else
15.      count_overlap is overlapping links between candidate and universe exclude backup.primary
16.      If count_overlap ≥ max_overlap then
17.        max_overlap = counter_overlap
18.        max_candidate =candidate
19.      end if
20.    end if
21.  end for
22.  if max_candidate is from primary_candidates then
23.    add max_candidate to dfos_primary
24.  else
25.    add max_candidate to dfos_backup
26.  end if
27. end while
28. Return dfos_backup and dfos_backup

TABLE 1

Network parameters

|  | Oxford | INS | ValleyNet | Palmetto | ION | US_carrier |
|---|---|---|---|---|---|---|
| No. of nodes | 19 | 24 | 31 | 45 | 98 | 150 |
| No. of links | 24 | 28 | 33 | 70 | 97 | 171 |
| Ave. node degree | 2.53 | 2.33 | 2.13 | 3.11 | 1.98 | 2.28 |
| Ave. link distance | 51.44 | 59.06 | 44.78 | 54.96 | 38.02 | 49.80 |

TABLE 2

No. of sensors used

|  | Oxford | INS | ValleyNet | Palmetto | ION | US_carrier |
|---|---|---|---|---|---|---|
| Dedicated Protection | 38 | 52 | 46 | 110 | 120 | 264 |
| Shared-Random | 33.28 | 45.8 | 41.9 | 92.9 | 118.88 | 241.42 |
| Shared-MSC | 32 | 45 | 39 | 92 | 108 | 231 |
| Shared-One | 28 | 36 | 35 | 75 | 93 | 187 |
| ILP | 25 | 36 | 33 | * | * | * |

At this point, while we have presented this disclosure using some specific examples, those skilled in the art will recognize that our teachings are not so limited. More specifically, we have defined and formulated a survivable DFOS placement problem and have disclosed an ILP solution that advantageously can achieve an optimal performance in terms of the number of sensors used. Additionally, we have disclosed several efficient heuristic algorithms, including both dedicated protection approaches and shared protection approaches. Our shared protection algorithm treats the allocation of primary and backup DFOS placement equally and optimizes these assignment in a one-step global optimization manner, thus achieving a performance that is a near-optimal solution obtained by the ILP. We have conducted comprehensive simulations to demonstrate the effectiveness of our heuristic algorithm. Accordingly, this disclosure should only be limited by the scope of the claims attached hereto.

The invention claimed is:

1. A method for determining distributed fiber optic sensing (DFOS) sensor assignments tolerant of a single link failure, the method comprising:

providing a DFOS network having a plurality of nodes optically connected by a plurality of optical links, said network defined by G(V,E), where V is a set of end nodes, and E is a set of optical fiber links that and connect the end nodes in the V set, and G is subject to a single link failure;

determining possible primary DFOS sensor assignments as primary_route_set;

determining all backup DFOS sensor assignments as backup_route_set; and from the primary_route_set and the backup_route_set, selecting a minimum set that provides shared protection against the single link failure and provides sensor services without interruption during the single link failure;

wherein the primary_route_set comprises primary_routes and the backup_route_set comprises backup_routes, the backup_routes exhibiting a tree topology and each backup_route provides backup protection to a plurality of primary_routes; and wherein any routes considered for inclusion into the primary_route_set and the backup_route_set are considered equally, and the primary DFOS and backup DFOS sensor assignments are made as a one-step global optimization.

2. The method of claim 1 further comprising identifying, in the DFOS network, all possible fiber sensing routes constrained by a sensing range limit at each node considered as as a candidate for a primary DFOS sensor assignment.

3. The method of claim 2 further comprising identifying, in the DFOS network, all possible fiber sensing route trees constrained by a sensing range limit at each node considered as a candidate for a backup DFOS sensor assignment.

4. The method of claim 3 further comprising considering all primary DFOS candidates and backup DFOS candidates equally, applying a greedy algorithm, and selecting a minimum set of DFOS assignments from the primary candidates and the backup candidates such that each optical fiber link in the network is sensed at least once from two directions.

5. The method of claim 4 wherein each individual optical fiber link that is shared by multiple primary_routes the number of backup_routes is greater than or equal to the number of sharing multiple primary_routes such that each primary_route has associated with it at least one backup_route when a single link failure occurs in the network.

6. The method of claim 5 wherein all primary_routes and backup_routes contain no loops and exhibit a distance that is less than a sensing range limit distance.

7. The method of claim 6 wherein all backup_routes provide sensing functions from a direction opposite to that provided by primary_routes for which the backup_routes provide a backup sensor function.

8. The method of claim 7 wherein the DFOS network provides Infrastructure as a Sensor (IaaS) services.

9. The method of claim 8 wherein the IaaS services provided include traffic and road condition monitoring.

\* \* \* \* \*